United States Patent [19]

Garrett, Jr.

[11] 4,121,019

[45] Oct. 17, 1978

[54] LEAD-ACID STORAGE BATTERY

[75] Inventor: Nelson Lee Garrett, Jr., Davenport, Iowa

[73] Assignee: Garrett Plante Corporation, Westchester, Ill.

[21] Appl. No.: 817,492

[22] Filed: Jul. 20, 1977

[51] Int. Cl.² .......................................... H01M 10/16
[52] U.S. Cl. ..................................... 429/94; 429/186; 429/225
[58] Field of Search ...................... 429/94, 186, 66, 96, 429/97, 99, 100, 123, 208, 225, 228

[56] References Cited

U.S. PATENT DOCUMENTS

| 2,487,499 | 11/1949 | Webb | 429/94 |
|---|---|---|---|
| 3,269,865 | 8/1966 | Swanson | 429/186 X |
| 3,472,696 | 10/1969 | Shoeld | 429/94 |
| 3,530,001 | 9/1970 | Harivel | 429/94 |
| 3,565,690 | 2/1971 | DuPlessix et al. | 429/94 |
| 3,862,861 | 1/1975 | McClelland et al. | 429/94 X |

FOREIGN PATENT DOCUMENTS

| 161,404 | 4/1921 | United Kingdom | 429/186 |
|---|---|---|---|
| 153,570 | 2/1922 | United Kingdom | 429/186 |

Primary Examiner—Anthony Skapars
Attorney, Agent, or Firm—Merriam, Marshall & Bicknell

[57] ABSTRACT

A long-life lead-acid storage cell comprises plate assemblies formed of strips of soft, essentially pure lead having a height to thickness ratio of 0.5-10. Each assembly is provided with an elongated resilient lowermost support bridge to prevent deformation of the lead. Composite plates are formed of a plurality of electrically interconnected vertically-stacked strips separated by elongated resilient strip retainers which prevent lateral displacement of the strips in a stack.

8 Claims, 5 Drawing Figures

LEAD-ACID STORAGE BATTERY

The present invention relates to lead-acid storage batteries and more particularly to an improved storage battery employing Plante plates, i.e., sheets of lead on which the active material is formed directly from the lead of the plate.

BACKGROUND OF THE INVENTION

The original lead-acid storage battery developed by Gaston Plante more than 100 years ago employed as plates two thin lead sheets formed into a coil separated by rubber insulators and immersed in a dilute aqueous solution of sulfuric acid. In the commercial lead storage batteries which developed from Plante's original version, the lead sheets were replaced by lead-alloy grids packed or pasted with mixtures of lead oxides, the metal of the grid being an alloy of lead and another metal, usually antimony or calcium. These modifications were made to solve several practical problems encountered in the commercial production of lead-acid batteries, despite the knowledge that pure lead plates, as employed by Plante, have certain advantages over pasted lead-alloy plates. Specifically, in the pasted type of plate, the paste filling has a tendency to fall out of the gride during use of the battery and to accumulate in the bottom of the case. If the accumulated material bridges the gap between adjacent plates, it creates a short-circuit between the plates and effectively ruins the cell. In order to minimize the possibility of this type of shorting, it has been conventional to suspend the plates from the top of the battery case with a gap between the bottom of the plates and the bottom of the case for accumulation of the plate material. Under these conditions it was not feasible to use pure lead which is very soft and tends to flow or deform under its own weight. Plates formed of pure lead, particularly those suspended from the top of the plate, tend to be subject to cold flow, producing distortions leading to shorting of adjacent plates. In order to harden or stiffen the lead used in the plate, it became conventional to use an alloying element, most commonly antimony or calcium. Both antimony and calcium harden lead, rendering it stiffer and more resistant to cold flow, or other deformation, but both also produce certain undesirable effects, such as an increase in electrical resistance, and rate of oxidation, which unfavorably alter the performance characteristics of the battery and decrease its life.

SUMMARY OF THE INVENTION

In accordance with the present invention, there is provided a lead-acid storage cell employing Plante-type plates, i.e., those made of a sheet or strip of essentially pure lead. The plates, being soft and malleable, can be shaped, in a preferred embodiment of the invention, in a configuration similar to that of the original Plante cell, i.e., a spiral form with suitable separators between adjacent coils of the lead sheets. The lower edge of each vertical plate, whether flat or spiral, rests on, and is supported by, a narrow, flexible sediment bridge which not only inhibits cold flow of the lead plate under its own weight but also serves to provide a reservoir at the bottom of the battery case for any active plate material which may be dislodged from the surface of the plates. The sediment bridge is provided with transverse reservoir openings spaced along the lower edge of the bridge in which such sediment can accumulate during the operation of the battery without danger of possible shorting of adjacent plates.

In order to further inhibit cold flow or other deformation, the plates are formed from one or more strips of lead, each strip having a height-to-thickness ratio within the range 0.5-10, and preferably 1-2.5. It has been found that if the strip has the defined height-to-thickness ratio, the distortion of the lead produced by cold flow, even during extended periods of time, e.g., twenty years or more, is inhibited sufficiently to prevent bridging between closely spaced plates, thus eliminating short circuiting by deformation of adjacent plates.

The capacity of a cell having a given horizontal cross-sectional area can be increased by stacking additional strips vertically above one another, with the contiguous edges of the vertical strips held and separated by means of flexible insulators having a cross section similar to an I-beam. The periodic interruption of a tall, vertical plate in this manner limits the extent of deformation which would otherwise be experienced with an uninterrupted plate having the same height.

In a preferred embodiment of the invention, a spiral form of cell is provided, in which two plates or strips of lead separated by conventional separators are wound about a central inert mandrel having a cross section suitably selected to produce in the assembled electrode structure a desired configuration, typically square or rectangular. In this manner, the active plate material which can be inserted into a square or rectangular case of a given cross-sectional area can be increased, thereby increasing the storage capacity of the cell. The mandrel can be further provided with a vertical central bore communicating with the bottom of the battery, through which the electrolyte can be inspected, reconditioned, or removed for filtration therefrom of any sediment which accumulates in the bottom of the case. In this manner extremely long-life operation of the cell can be achieved.

DESCRIPTION OF THE DRAWINGS

The invention will be better understood from the following detailed description thereof taken in conjunction with the accompanying drawings, in which.

DETAILED DESCRIPTION

Figure 1:
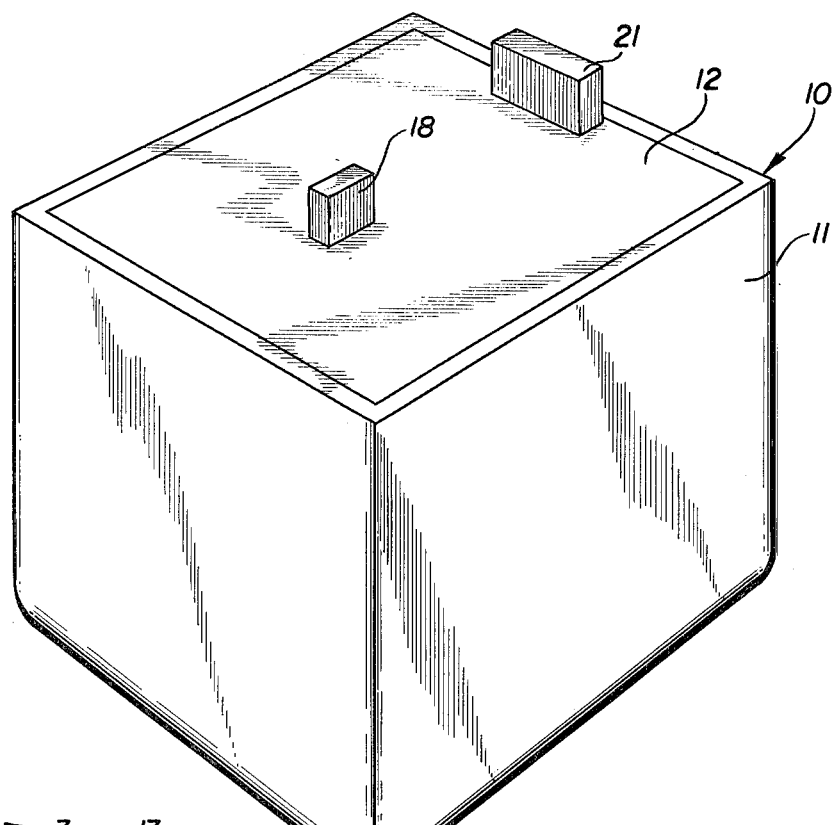
FIG. 1 is an isometric view of a typical cell of the invention, having a generally rectangular case.

As shown in the drawings, a typical preferred embodiment of the cell 10 of the invention comprises a battery case 11 having a removable or fixed cover 12, both of which are formed of conventional materials, such as polypropylene or hard rubber. Inserted within the case is a coiled electrode assembly 13 comprising two adjacent vertically extending composite sheets of lead, one of which, e.g., 14, serves as the positive plate, and the other of which, e.g., 16, serves as the negative plate of the cell. Sandwiched between the positive and negative plate assemblies are layers 33, 34, and 36 of spacing and insulating material, tthe function of which will be described in detail below. Attached to one end of the negative plate is an electrically conducting lug strip 17 which passes through cover 12 and becomes the negative terminal 18 on the top of the cell. Another lug strip 19 is attached to one end of positive plate 14 and extends through cover 12 to form the positive terminal 21 of the cell.

The lower edges of the positive and negative plate assemblies 14 and 16 rest in and are supported by sediment bridges 22 and 23, which are elongated, flexible strips of a resilient material which is shock-absorbing, electrically insulating, and resistant to the battery acid. Suitable materials for forming the sediment bridges are polytetrafluoroethylene and similar fluorinated resins, polypropylene, and certain polyester resins. The top surface of each sediment bridge is provided with a groove, e.g., 24, wide enough to accommodate the width of the plate and deep enough to prevent the plate from slipping out of engagement therewith. Spaced along the lower edge of each sediment bridge are openings 26 passing through the thickness of the bridge. These openings, the dimensions of which are not critical, provide a reservoir space for sediment material which may be dislodged from the plates to accumulate in the bottom of the cell, away from possible contact with the plates, thereby eliminating the possibility of internal shorting between adjacent plates. The openings can typically be formed in semi-circular fashion, as shown, with a radius approximately equal to one-half the vertical height of the sediment bridge and with a spacing between adjacent openings approximately equal to the diameter thereof. Regardless of the number or form of the reservoir openings, a sufficient bearing surface on the lower edge of the sediment strip must be maintained to assure that the upper edge thereof, i.e., that in contact with the lead plate, remains sufficiently rigid to support the weight of the lead plate in contact therewith along substantially the entire length thereof.

In the embodiment shown in the drawings, each of plate assemblies 14 and 16 is formed of two strips 27, 28 of lead. Each of the strips, e.g., 27, in a single plate assembly, e.g., 14, preferably has the same dimensions, which are not necessarily identical to those of the strips 28 in the other plate assembly, i.e., 16. Because the positive plate in a lead-acid battery has a tendency to be consumed at a faster rate than the negative plate, it is generally preferred to make the lead strips 27 in the positive plate assembly 14 somewhat thicker than those (28) in the negative plate 16, as illustrated in the drawings. The capacity of a cell of a given horizontal cross-sectional area can be increased by using a plurality of horizontally extending, vertically aligned strips to form a plate assembly having a total surface area suitable for the intended use of the cell. Thus, in the embodiment shown in the drawings, more than two lead strips 27 and 28 can be used if greater capacity is desired in the cell, or alternatively a single lead strip can be used if lesser capacity is acceptable for a particular use. In order to maintain structural integrity and to prevent deformation of the essentially pure lead used in the strips over extended storage periods, the height (H) to thickness (T) ratio of each lead strip is within the range of about 0.5–10 and preferably in the range of 1–2.5.

When more than one strip (27 or 28) of lead is used to make a composite positive or negative plate assembly, the individual strips are separated, in accordance with the invention, along their contiguous edges by an elongated strip retainer 29, 30 which is suitably formed of a flexible, resilient, electrically insulating, acid resistant material similar to that used in sediment bridge 22. The upper and lower surfaces of the strip retainer are provided with grooves 31, giving the strip retainer a cross-sectional configuration similar to that of an H- or I-beam. Each of the grooves in the upper and lower surfaces of the strip retainer should be slightly wider than the thickness of the lead strip and deep enough to prevent lateral relative separation of the lead strips above and below the retainer. In addition to preventing relative lateral displacement of the vertically aligned lead strips, the strip retainers provide lateral reinforcement to the edges of the strip, to prevent bulging or cold flow which can lead to distortion and ultimate destruction of the plate.

Figure 3:
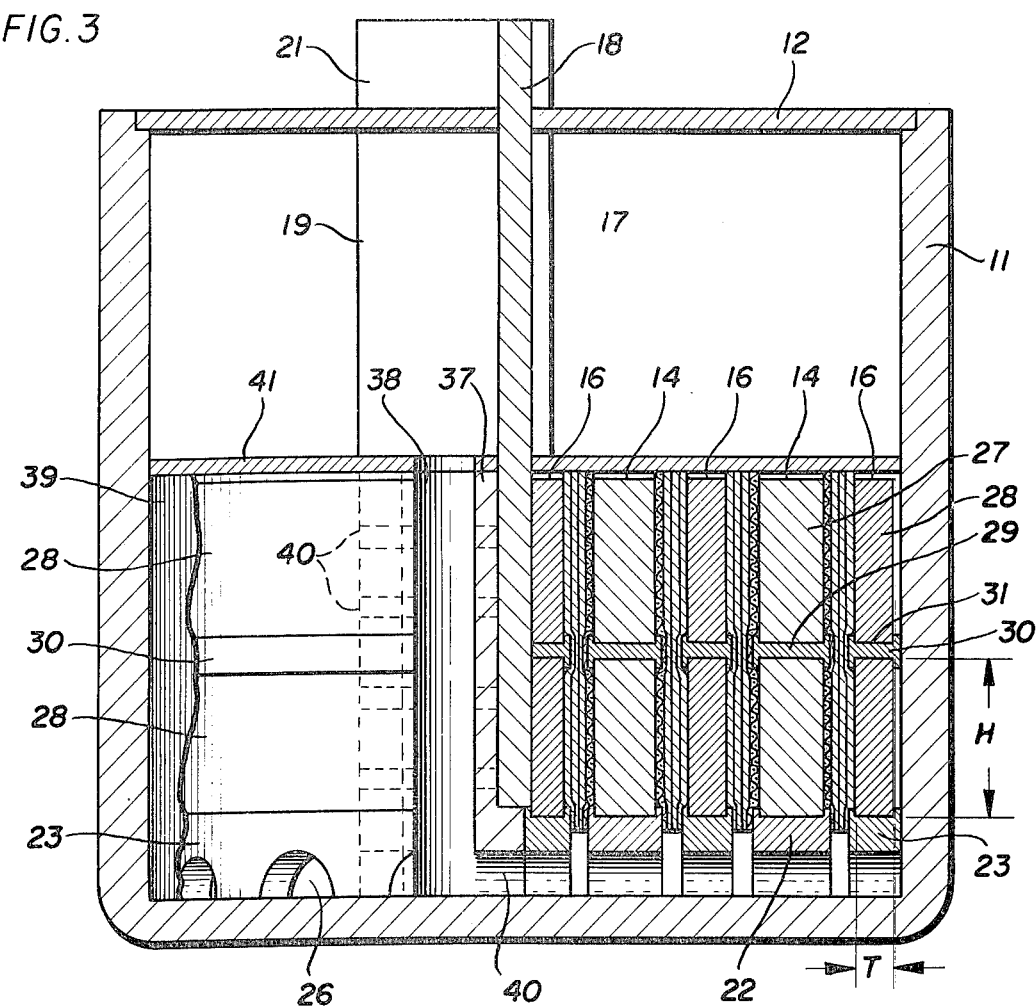
FIG. 3 is a sectional view along the line 3—3 of FIG. 2.

In a cell using multi-strip plate assemblies, such as that shown in FIG. 3, the ends of the lead strips, e.g., 28, in each plate assembly, e.g., 16, are electrically interconnected by a transverse frame strip, e.g., 32, formed of a material such as lead or silver which has good electrical conductivity, resistance to acid, and dimensions suitable for carrying the maximum current generated in the operation of the cell. The transverse frame strip 32 can be formed, as shown, as an integral extension of lug strip 17. Alternatively, lug strip 17 and frame strip 32 can be individual elements. Although not shown in the drawings, the lower end of positive lug strip 19 interconnects one end of the individual lead strips 27 in positive plate assembly 14, while the other ends are interconnected by frame strip 35 (FIG. 3).

Figure 4:
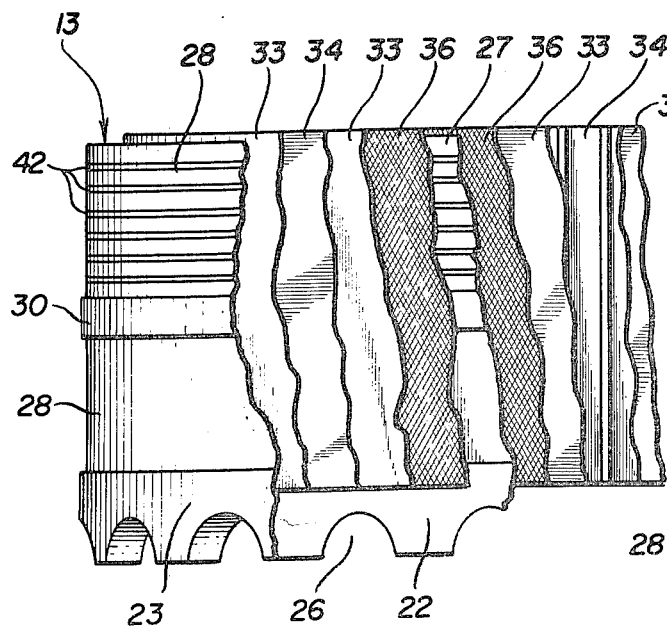
FIG. 4 is a front view of a portion of the electrode assembly, partially broken away to show the individual plates and separators between the plates.
Figure 5:
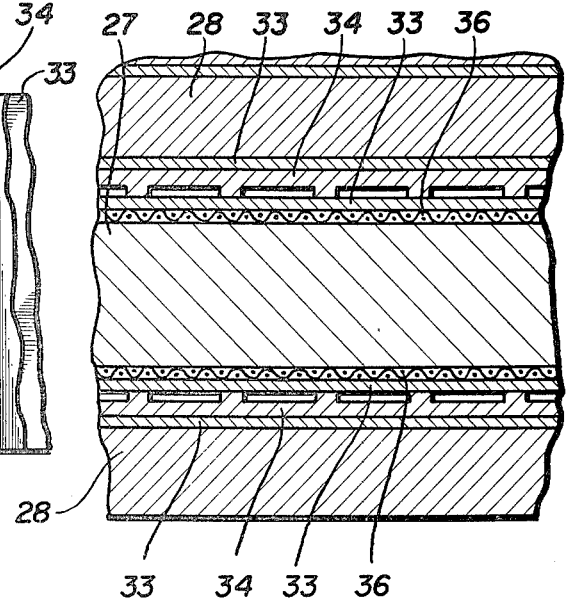
FIG. 5 is a top view of a portion of the plate and separator assembly shown in FIG. 4.

As shown in FIGS. 4 and 5, interposed between positive plate assembly 14 and negative plate assembly 16 in the electrode assembly 13 are conventional insulating materials, typically a glass fiber mat 33 positioned against the vertical faces of the positive plate assembly and a high porosity separator 34 provided in conventional fashion with vertical riser strips or a raised surface facing the positive plate. Another glass fiber mat 33 is desirably positioned between separator 34 and the face of negative plate assembly 16.

If a cell is intended for use in applications where substantial mechanical shock can be expected, a preferred embodiment of the invention includes a thin, flexible mesh, grid-like, or perforated sheet material 36 placed immediately adjacent one or both vertical surfaces of at least the positive plate assembly. The grid 36, suitably formed of a synthetic plastic, acid-resistant material, is bonded by suitable means, e.g., heat sealing or glue, to the outer edge of each strip retainer 29 and to an edge of sediment bridge 23. This construction provides a box around lead strips 27 in composite plate 14 and acts to retain the active material on the face of the plate over an extended service life, in addition to maintaining the strength and shape of the plate assembly.

Figure 2:
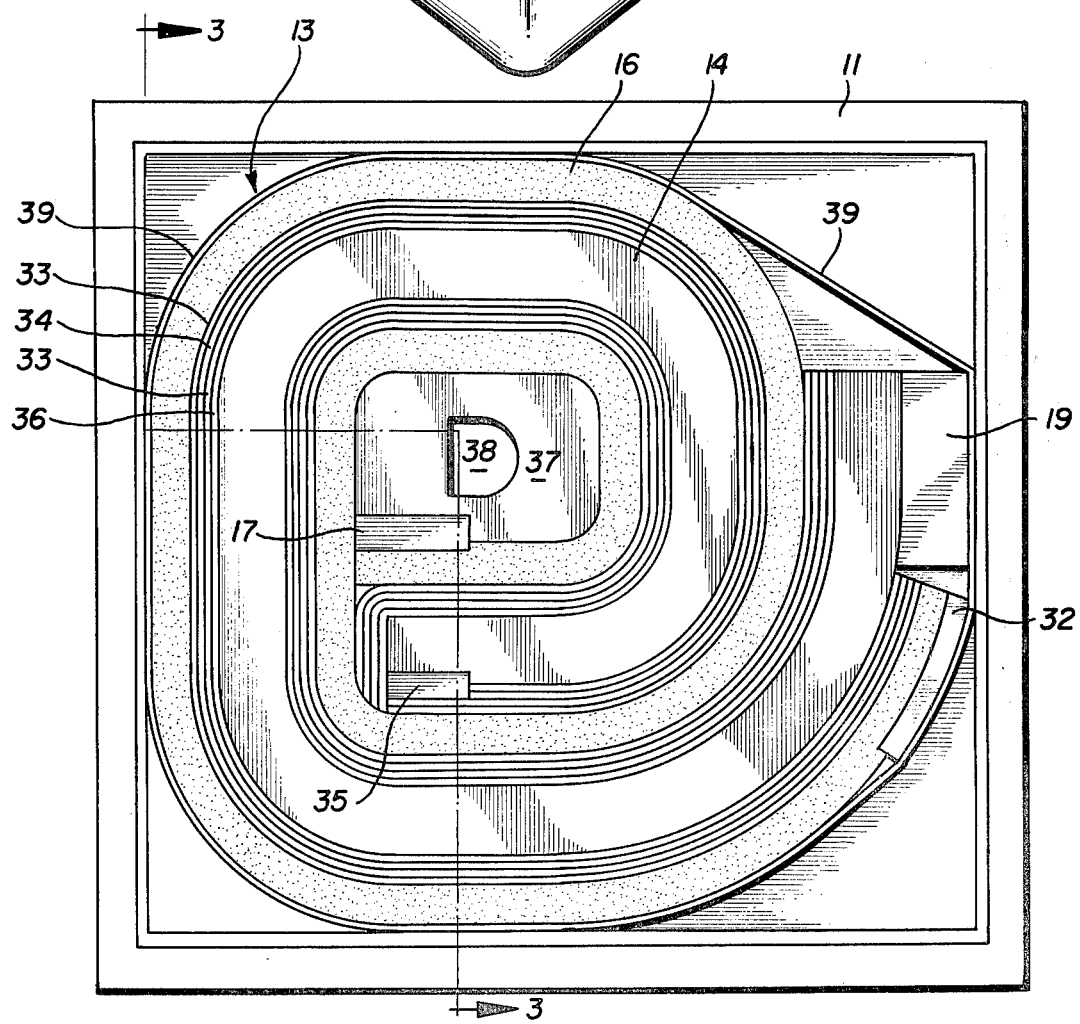
FIG. 2 is a top view of the cell of FIG. 1 with the top of the case and an interior "moss" shield removed, showing the coiled electrode assembly wound about a central mandrel.

In the embodiment shown in FIGS. 2-4, the positive and negative plate assemblies 14 and 16, with the appropriate interleaved spacing and insulating layers 33, 34 and 36, are wound in spiral fashion about a central mandrel 37. The mandrel, formed of a suitable electrically insulating and acid resistant material, has a horizontal cross-section which has a square, rectangular, triangular or other polygonal shape, and which has rounded corners having a radius consistent with the flexibility of the lead strips from which the composite plate are formed. The polygonal shape of the mandrel confers a similar configuration to the assembled electrode structure and permits a greater quantity of plate material to be inserted in a square, rectangular, triangular, or other polygonal case than would be possible if no mandrel, or one having a circular cross-section, is employed. The mandrel desirably is provided with a vertical bore 38 throughout its length, and spaced horizontal bores 40 for inspection of the electrolyte at any level for removal of any accumulated sediment on the bottom of the case, by withdrawing the electrolyte through the bore and removing any sediment suspended therein. In order to remove sediment in this manner, it is preferred that the inner bottom of case 10 be flat, as shown.

After electrode assembly 13 is fabricated in spiral form, it is desirable to wrap it with a sheet 39 (FIG. 2) of a thin plastic high-strength material, such as a polyester resin film, which maintains the assembly intact and aids in preventing damage to the electrode assembly during installation thereof in the battery case. A "moss" shield 41, formed of a thin sheet of hard rubber or other inert plastic material and provided with appropriate perforations to accommodate lug strips 17 and 19, to provide access to bore 38 in mandrel 37, and to permit free circulation of electrolyte, is placed on top of and in contact with the top edges of the electrode assembly. The "moss" shield serves to prevent internal shorts which may occur due to bridging by conductive active plate material between adjacent faces of the positive and negative plates in a manner known to those skilled in the art.

In order to increase the surface area of the plate assemblies, and therefore the capacity of the cell in accordance with known principles, it is preferred to provide grooves 42 in the exterior faces of the lead strips of which the plate assemblies are formed, as shown in FIG. 4. The grooves, suitably about 2 mm deep and 1 mm wide, are spaced about 1-2 mm apart and extend throughout the length of each of the lead strips. The plate surface area can be further increased by applying to the faces thereof random shallow scratches which serve the same function as grooves 42.

As is the case with all lead-acid storage batteries, active material must be formed on the surfaces of the positive and negative plates before the cell can be used. The active materials, i.e., lead peroxide on the surface of the positive plate, and sponge lead on the surface on the negative plate, can be formed on the lead strips used in the present invention in any conventional manner before the cell is assembled. Alternatively, the completed cell can be treated in conventional fashion after assembly in order to form the active plate material, in accordance with procedures known to those skilled in the art.

Since the design of the cell of the invention overcomes the mechanical defects heretofore associated with the use of soft lead plates, and since the presence of any extraneous metal in the lead plates is disadvantageous, it is preferred that the lead used in forming the plates in the cell of the invention be as pure as possible, consistent with availability and cost. In order to permit the lead to maintain the softness permitting it to be coiled in the preferred embodiment described above, the lead used must be at least 99.0%, and preferably at least 99.6%, pure, and should be as free as possible of alloy elements, e.g., antimony and calcium, which are known to have an adverse effect on the life or performance of the cell.

Although the invention has been described with particular reference to a preferred embodiment in which the plates are rolled in helical form, the invention is not restricted to this type of construction. In another embodiment, the cell can be formed with conventional alternating positive and negative planar plate assemblies separated by conventional spacing and insulating materials. Regardless of whether the plates are flat or coiled in form, however, a sediment bridge, e.g., 23, supporting the lower edge of each plate assembly and a strip retainer, e.g., 29, between strips of lead forming a plate assembly, must be used, as previously described.

The foregoing detailed description has been given for clearness of understanding only, and no unnecessary limitations should be understood therefrom, as modifications will be obvious to those skilled in the art.

What is claimed is:

1. A lead-acid storage cell having a case adapted to hold an electrolyte;
   first and second electrode plate assemblies enclosed within said case;
   at least one electrically insulating porous separator positioned between said first and second assemblies for preventing direct electrical contact therebetween while permitting said electrolyte free access to both of said assemblies;
   each of said assemblies comprising:
   a plurality of elongated strips of lead each having a generally vertical face, said strips being vertically arranged in a stack, each of said strips having a ratio of height-to-thickness within the range of 0.5-10;
   an elongated, resilient shock-absorbing retainer separating and in contact with the horizontal edges of adjacent strips in said stack, the upper and lower faces of said retainer being provided with means for preventing relative lateral displacement of said adjacent strips;
   an elongated, resilient shock-absorbing support bridge positioned below and in contact with the lowermost strip in said assembly, the upper surface of said bridge being provided with means to prevent relative lateral displacement between said bridge and said lowermost strip, and the lower surface of said bridge resting on the bottom of said case; and
   electrically conductive means electrically interconnecting the strips in said assembly.

2. A cell in accordance with claim 1 in which said strips have a height-to-thickness ratio of 1-2.5.

3. A cell in accordance with claim 2 in which said strips contain at least about 99.0% lead.

4. A cell in accordance with claim 1 in which said first and said second assemblies, including said strips, said support bridges, and said strip retainers, are helically arranged about a common axis, with said porous separator positioned between adjacent faces of said assemblies.

5. A cell in accordance with claim 4 in which said assemblies and said separators are wound about a polygonal mandrel.

6. A cell in accordance with claim 5 in which said mandrel has a longitudinal bore communicating with the electrolyte in said case.

7. The cell of claim 4 wherein said ratio is within the range of 1-2.5.

8. The cell of claim 1 wherein at least one of said strips is provided adjacent its vertical face with a thin perforated acid resistant support sheet joined along its lower extremity to said support bridge.

* * * * *